United States Patent
Gluck

(10) Patent No.: US 9,736,117 B2
(45) Date of Patent: *Aug. 15, 2017

(54) METHODS AND SYSTEMS FOR CONTEXT-BASED APPLICATION FIREWALLS

(71) Applicant: salesforce.com, inc., San Francisco, CA (US)

(72) Inventor: Yoel Gluck, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/194,429

(22) Filed: Jun. 27, 2016

(65) Prior Publication Data

US 2016/0308835 A1    Oct. 20, 2016

Related U.S. Application Data

(63) Continuation of application No. 14/874,225, filed on Oct. 2, 2015, now Pat. No. 9,407,606, which is a
(Continued)

(51) Int. Cl.
*G06F 21/00* (2013.01)
*H04L 29/06* (2006.01)

(52) U.S. Cl.
CPC ...... *H04L 63/0263* (2013.01); *H04L 63/0245* (2013.01); *H04L 63/0254* (2013.01); *H04L 63/168* (2013.01); *H04L 63/0428* (2013.01)

(58) Field of Classification Search
None
See application file for complete search history.

(56) References Cited

U.S. PATENT DOCUMENTS 5,577,188 A    11/1996 Zhu
5,608,872 A    3/1997 Schwartz et al.
(Continued)

OTHER PUBLICATIONS

Notice of Allowance for U.S. Appl. No. 14/874,225, mailed Mar. 31, 2016, 15 pages.
(Continued)

*Primary Examiner* — Jung Kim
*Assistant Examiner* — Ngoc D Nguyen
(74) *Attorney, Agent, or Firm* — Alpine Technology Law Group LLC

(57) ABSTRACT

Context-based application firewall functionality. A user session is initiated with a client device. The user session allows access a remote resource on a server device coupled with the client device over a network. The connection between the client device and the remote resource is through an application firewall. An application firewall context setup is performed with the application firewall in response to the user session. The application firewall context comprises firewall context information to be used during the user session to perform network and application security operations with the application firewall. A response is created to provide information from the remote resource to the client device. The response includes metadata to be used to update the firewall context information. The firewall context information is updated with the application firewall based on the metadata. The response is transmitted to the client device.

24 Claims, 6 Drawing Sheets

Related U.S. Application Data continuation of application No. 12/982,725, filed on Dec. 30, 2010, now Pat. No. 9,160,710.

(60) Provisional application No. 61/358,488, filed on Jun. 25, 2010.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,854,063 B1 | 2/2005 | Qu et al. |
| 7,096,495 B1 | 8/2006 | Warrier et al. |
| 7,340,411 B2 | 3/2008 | Cook |
| 7,342,906 B1 | 3/2008 | Calhoun |
| 7,620,655 B2 | 11/2009 | Larsson et al. |
| 8,904,511 B1 | 12/2014 | O'Neill et al. |
| 9,294,442 B1 * | 3/2016 | Lian .................. H04L 63/20 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0088409 A1 | 5/2004 | Braemer et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0262554 A1 | 11/2005 | Brooks et al. |
| 2006/0168345 A1 | 7/2006 | Siles et al. |
| 2007/0118893 A1 | 5/2007 | Crawford |
| 2008/0229088 A1 | 9/2008 | Barth et al. |
| 2010/0325357 A1 | 12/2010 | Reddy et al. |
| 2011/0154471 A1 | 6/2011 | Anderson et al. |

OTHER PUBLICATIONS

Final Office Action for U.S. Appl. No. 12/982,725, mailed Dec. 31, 2013, 19 pages.

Office Action for U.S. Appl. No. 12/982,725, mailed Mar. 29, 2013, 22 pages.

Office Action for U.S. Appl. No. 12/982,725, mailed Jun. 19, 2014, 21 pages.

Final Office Action for U.S. Appl. No. 12/982,725 mailed Nov. 19, 2014, 24 pages.

Notice of Allowance for U.S. Appl. No. 12/982,725, mailed Jun. 3, 2015, 8 pages.

* cited by examiner

METHODS AND SYSTEMS FOR CONTEXT-BASED APPLICATION FIREWALLS

CLAIM OF PRIORITY

This continuation application claims the benefit of U.S. patent application Ser. No. 14/874,225, entitled "METHODS AND SYSTEMS FOR CONTEXT-BASED APPLICATION FIREWALLS", by Yoel Gluck, filed Oct. 2, 2015, and also claims the benefit of U.S. patent application Ser. No. 12/982,725, entitled "METHODS AND SYSTEMS FOR CONTEXT BASED APPLICATION FIREWALLS", by Yoel Gluck, filed Dec. 30, 2010, now U.S. Pat. No. 9,160,710, issued Oct. 13, 2015, and further claims the benefit of U.S. Provisional Patent Application No. 61/358,488 entitled "Methods And Systems For Context Based Application Firewalls", by Yoel Gluck, filed Jun. 25, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 12/982,751 entitled "Methods and Systems for Providing a Token-Based Application Firewall Correlation", by Yoel Gluck, filed Dec. 30, 2010, now U.S. Pat. No. 9,350,705; and U.S. patent application Ser. No. 15/159,732 entitled "Methods And Systems For Providing a Token-Based Application Firewall Correlation", by Yoel Gluck, filed May 19, 2016, which is a continuation application of U.S. patent application Ser. No. 12/982,751; and U.S. patent application Ser. No. 12/982,769 entitled "METHODS AND SYSTEMS FOR PROVIDING CONTEXT-BASED OUTBOUND PROCESSING APPLICATION FIREWALLS", by Yoel Gluck, filed Dec. 30, 2010.

FIELD OF THE INVENTION

Embodiments of the invention relate generally to firewalls and network security. More particularly, embodiments of the invention relate to techniques for providing context-based application firewalls.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Web applications are a big part of applications today. They vary from simple web site, travel and booking, enterprise, banking applications and many more. Each of these applications has a set of security threats relevant to it. These applications tend to have security code integrated in to the application itself, however; because these applications are relatively large, the surface is too big to cover with a single choke point. With the increased complexity comes additional risk for undetected vulnerabilities. This is one of the reasons web applications some times use a separate web application firewall system. This allows a separate code base to use a single choke point and evaluate the entire application behavior at run time for potential vulnerabilities.

Examples of vulnerabilities these applications may be looking for are: Cross-Site Scripting (XSS), Cross-Site Request Forgery (CSRF), SQL Injection, Un-authorized access, etc. Current application firewall solutions do not have the capability to filter based on some known context derived from application logic. The approach they use is usually a) searching for keywords, or b) building a statistical model of standard usage and searching for deviations. These approaches have very limited capability in a dynamic environment.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

As used herein, "application firewall" and/or "firewall" generally refers to an application firewall entity that provides a higher-level analysis of network traffic (e.g., the application level, layer 5+), for example, inspecting traffic specific to an application based on the logic of the application. In contrast, traditional firewalls inspect Layers 3 and 4 and generally do IP- and port-based filtering and logic. Described herein are context-based application firewalls that utilize context information from one or more applications. The techniques described herein may be utilized by application firewalls, but may also be incorporated into traditional firewalls.

An example environment in which the shortcomings discussed above could be detrimental is a multitenant environment. In one embodiment, the multitenant environment may be modified and customized per tenant. For example the Universal Resource Locator (URL) parameter "j:xx1a:yy2" may mean one data type for one tenant and another data type for another tenant. Another example is that the URL content can be private for one tenant and should enforce encryption and authentication. This may cause any statistical assumptions to be incorrect and therefore render them useless for network security purposes.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

Figure 1A:
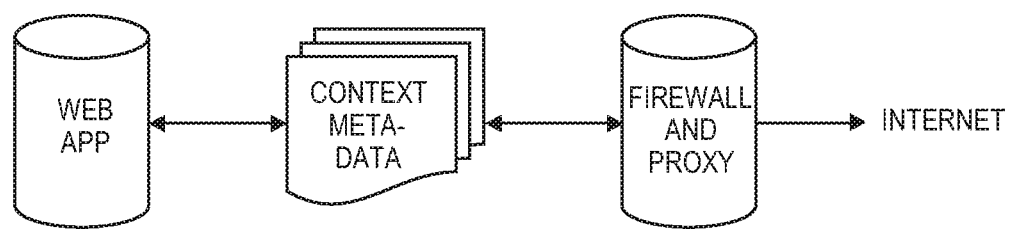
FIG. 1A is a conceptual illustration of one embodiment of firewall and network application system in which two servers are utilized.
Figure 1B:
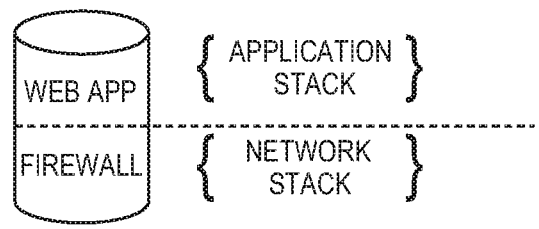
FIG. 1B is a conceptual illustration of one embodiment of firewall and network application system in which one server is utilized for both components. In this illustration the firewall is hooked into the lower levels of the stack.
Figure 1C:
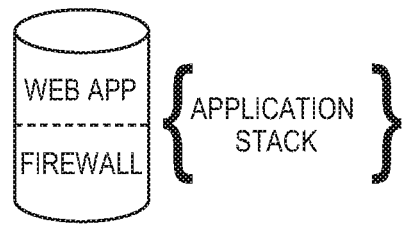
FIG. 1C is a conceptual illustration of one embodiment of firewall and network application system in which one server is utilized for both components. In this illustration the firewall is hooked into the higher levels of the stack.
Figure 2:
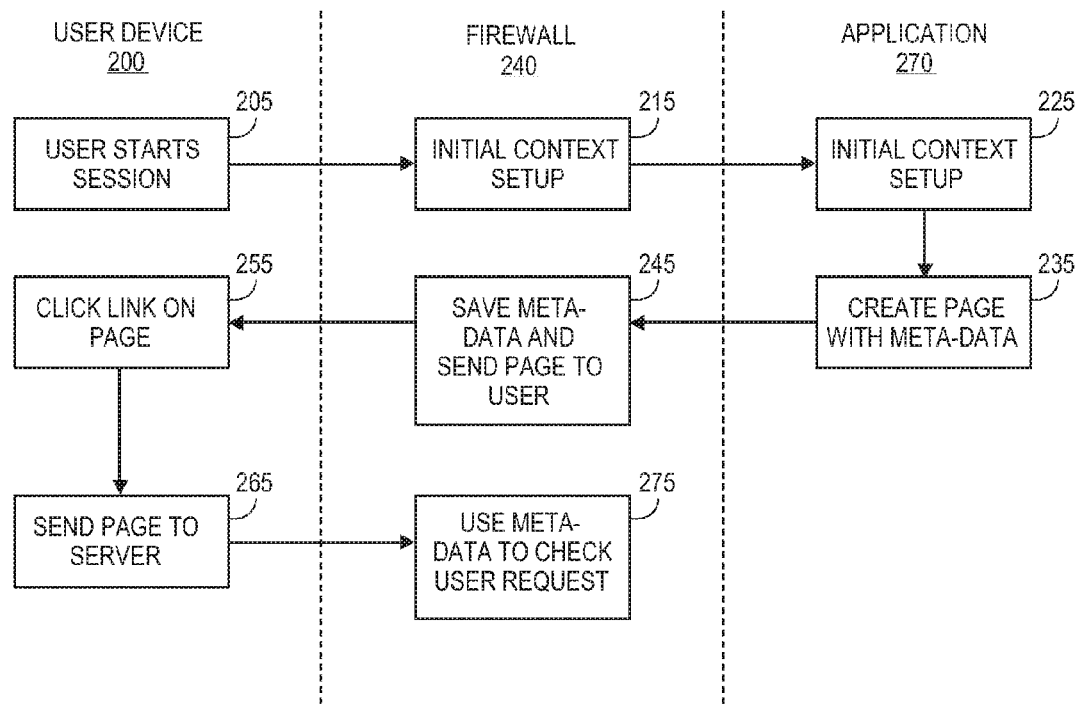
FIG. 2 is a conceptual illustration of an interaction between a user device, a firewall and a web application in which context-based firewalls may be implemented in which the context information is stored on the firewall.

FIGS. 1A-1C described herein are various context-based application firewalls that may maintain a context between an application firewall and one or more other web-based applications. This context may be used by both components to make security evaluations. Context-based application firewall can be formed in multiple layouts, including the following examples: 1) One server running a web application, another server acting as a proxy for communications and acting as the firewall, as illustrated in FIG. 1A, 2) Both components may exist on a single server but in two separate stack layers in the network (e.g., the firewall component can be in a similar layer to a standard OS firewall), as illustrated in FIG. 1B, and/or 3) Both components on a single server but in two separate stack layers in the application (e.g., the firewall component can be in a layer in the app server, but below the application logic layer), as illustrated in FIG. 1C.

Context information can be sent between components according to multiple timing approaches including, but not limited to, the following examples: on-demand, batch and/or shared location. In an on-demand embodiment, context information is sent as needed between peer systems, for example, when a user is requesting a page or starting a session. In a batch embodiment, at specified intervals, or in response to specified events or conditions, context information may be shared. In a shared location embodiment, one or more shared locations may be utilized to store context information. The shared location(s) may be accessible by one or more components utilizing and/or updating the context information.

In one embodiment, the context can be provided using metadata in standard formats such as Extensible Markup Language (XML) documents, in HTTP headers as part of the request/response, in HTML body comments, and in synchronous/asynchronous communications. The data can be captured by the firewall and removed before the firewall forwards the rest to the user. In alternate embodiments, for example, but if the data is not sensitive, it may be left in the request. In another embodiment, the context information may be sent signed to the user, and then used after verifying the signature. To make sure the user does not replay other signed data, time stamps may be used and verified, or the signature may be tied to a request with an identifier, and that information may be kept on the firewall. Also if needed encryption can be added before sending to client.

The context information may be, for example, translation information, field validation information, request/response validation information, policies, user information, tenant/organization information, session information, and/or score information, etc. Translation information may include, for example, translation for dynamic content to pre-defined sets of rules and names (e.g., the context may indicate, for the current tenant and in the current request j:xx1:yy2 translates into <ORGID><FIELDNAME>). By giving it this constant name, the statistical model as well as the keyword approach may operate more efficiently on the dynamic content.

Field validation information may include, for example, specific or generic validation rules for pieces of data. For example, field A1 must be an integer, field A2 must be a string no longer than X characters, etc. Request/response validation information may include, for example, that a request must have certain fields, or for specified users a field can have certain values, for another user the field can have different values.

Policy information may be, for example, policies describing the actions to take in response to specific events. For example, if a field is missing, a user is trying to access a page he/she does not have access, an XSS was detected, etc. User information may be, for example, user-specific information such as the user name associated with the current request, location, time zone (this can help to detect deviations based on times, languages, and locations accessed from), role in organization, etc.

Tenant/organization information may be, for example, organization-specific information such as organization identifier. This can help keep statistics based on groups and not just per user and for all users. Session information may be, for example, current session context. For example, user A is authenticated and is currently viewing page X and CSRF token is Y. This can help protect against CSRF because only authenticated users from a specific group may be allowed to access specific sections, and only if they have the proper CSRF token, and only if they came from the page X, etc.

Score information may include, for example, score information set by the firewall and/or app and sent to one or more applications and/or firewalls. The application(s)/firewall(s) can use this information to decide on a more granular basis integration into the application. For example, for a specific tenant that the scoring is very clear (meaning their statistical model can build a very clear cut, for example, no one ever logs on after 5 p.m.), if the application detects it, the application can give a very high score assuming it is a bad request. For another tenant this might not be so easy, and the score might not be so clear cut, and therefore the action for the same score might depend on other information. The application/firewall can use all this and decide what to do based on specific actions, requests, and policies.

FIG. 2 is a conceptual illustration of an interaction between a user device, a firewall and a web application in which context-based firewalls may be implemented. The example of FIG. 2 is described in terms of a single user device interacting with an application through a firewall. However, any number of user devices may interact with the application through one or more firewalls. Also, multiple applications may interact with the one or more user devices. Further, for any component (e.g., user device, firewall, application), it is possible to have zero or more of that component.

In the example of FIG. 2, the context information is stored as metadata on the firewall. User device 200 may be any type of device that allows a user to access a remote application over a network connection, whether wired or wireless. In other embodiments, the techniques described herein may also be utilized in non-network configurations, for example, within a single system. Further description of devices that may function as user device 200 is provided below. Firewall 240 functions between user device 200 and a server or other host system providing application 270. In one embodiment, firewall 240 and/or application 270 are part of a multitenant environment. Further description of multitenant environments is provided below.

A user starts a session, 205. The user may start the session by, for example, using a browser to attempt to access application 270. The session may be started in other ways as well. For example, the user may be required to provide a user name and a password to start a session.

In response to the session starting, firewall 240 may perform an initial context setup, 215. In one embodiment, the initial context setup in the firewall includes the firewall designating a table/record or some other combination of one or more data structures to store context information related to the new session. The context information to be stored by the firewall may be one or more of the above examples and/or other contextual information that may be utilized to perform network and application security operations, for example, packet filtering and auditing.

In response to the session starting, application 270 may also perform an initial context setup, 225. In one embodiment, the initial context setup in the application includes the application designating a table/record or some other combination of one or more data structures to store context information related to the new session. The context information to be stored by the application may be one or more of the above examples and/or other contextual information that may be utilized to perform network and application security operations, for example, packet filtering and auditing.

When the session setup has been completed, application 270 may create a page (in the case of a web-based application) or other information relevant to the session, 235. In one embodiment the page provided by application 270 includes additional metadata to be used for communicating context information between application 270 and firewall 240. The metadata may be, for example, information to update the firewall context data based on operations and/or analysis of application 270.

Firewall 240 receives the page with the metadata. In one embodiment, firewall 240 forwards the page to user device 200 after removing the metadata. Firewall 240 saves the metadata, 245. In another embodiment, firewall 240 stores some or all the metadata, but does not remove it from the page before sending the page to user device 200.

In response to receiving the page, user device 200 may provide the information from application 270 to a user of user device 200. For example, user device 200 may provide a page view in a browser or some other graphical representation of the information provided by application 270. In response to receiving the information, the user may provide some input to user device 200, for example, by clicking on a link or otherwise interacting with the presented information, 255.

In response to the user input, user device 200 may send a page request, or other configuration of data, 265, to application 270. In order to get to application 270, the page request passes through firewall 240. When firewall 240 receives the page request from user device 200, firewall 240 utilizes the metadata and/or other context information stored on firewall 240 to check the page request from the user, 275.

When firewall 240 checks the page from user device 200, firewall 240 may make decisions on how to treat the page request based on the firewall context information. For example, if the page from user device 200 does not satisfy the criteria described by the context information, firewall 240 may drop or block the traffic corresponding to the page. In another example, firewall 240 may flag the traffic to provide additional information to application 270 to allow application 270 to make decisions on how to process the page request from user device 200.

As the session continues, context information in firewall 240 and/or application 270 may be updated as the monitored conditions change. This allows both firewall 240 and application 270 to make more informed decisions when processing traffic during the session. As discussed above with respect to FIGS. 1A-1C, the configurations of firewall 240 and application 270 may vary, but the use of the context information may be applied to any of the configurations.

Figure 3:
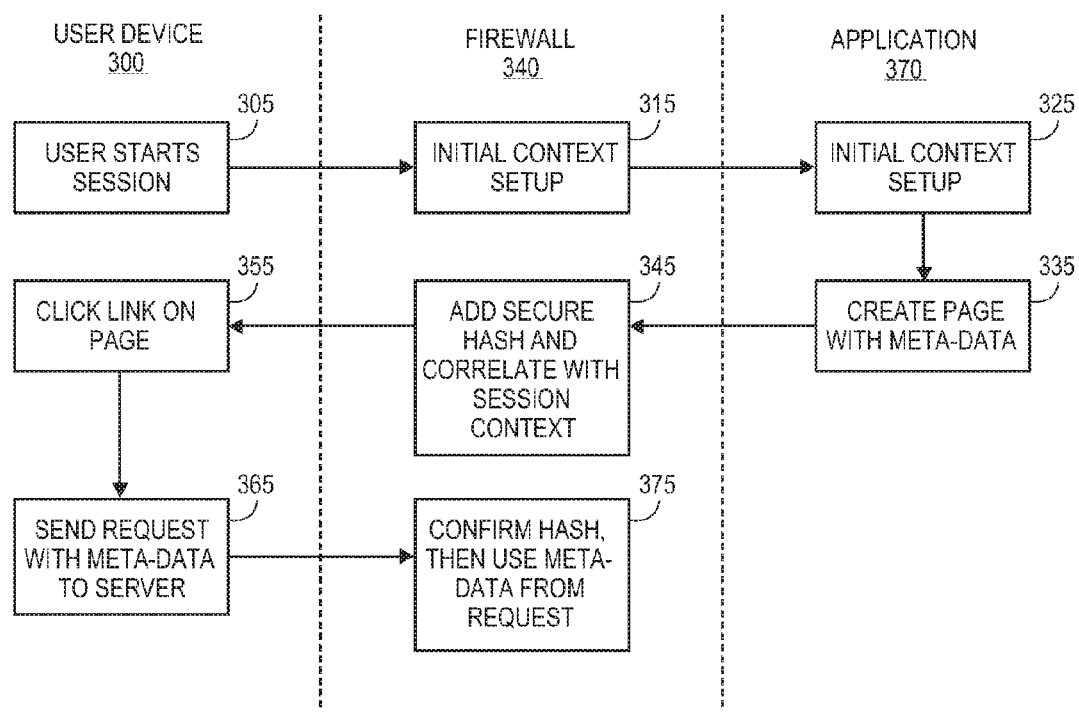
FIG. 3 is a conceptual illustration of an interaction between a user device, a firewall and a web application in which context-based firewalls may be implemented in which the context information is included in one or more pages as metadata.

FIG. 3 is a conceptual illustration of an interaction between a user device, a firewall and a web application in which context-based firewalls may be implemented. The example of FIG. 3 is described in terms of a single user device interacting with an application through a firewall. However, any number of user devices may interact with the application through one or more firewalls. Also, multiple applications may interact with the one or more user devices. Further, for any component (e.g., user device, firewall, application), it is possible to have zero or more of that component.

In the example of FIG. 3, the context information is stored as metadata on the firewall. In other embodiments, the techniques described herein may also be utilized in non-network configurations, for example, within a single system. User device 300 may be any type of device that allows a user to access a remote application over a network connection, whether wired or wireless. Further description of devices that may function as user device 300 is provided below. Firewall 340 functions between user device 300 and a server or other host system providing application 370. In one embodiment, firewall 340 and/or application 370 are part of a multitenant environment. Further description of multi-tenant environments is provided below.

A user starts a session, 305. The user may start the session by, for example, using a browser to attempt to access application 370. The session may be started in other ways as well. For example, the user may be required to provide a user name and a password to start a session.

In response to the session starting, firewall 340 may perform an initial context setup, 315. In one embodiment, the initial context setup in the firewall includes the firewall designating a table/record or some other combination of one or more data structures to store context information related to the new session. The context information to be stored by the firewall may be one or more of the above examples and/or other contextual information that may be utilized to perform network and application security operations, for example, packet filtering and auditing.

In response to the session starting, application 370 may also perform an initial context setup, 325. In one embodiment, the initial context setup in the application includes the application designating a table/record or some other combination of one or more data structures to store context information related to the new session. The context information to be stored by the application may be one or more of the above examples and/or other contextual information that may be utilized to perform network and application security operations, for example, packet filtering and auditing.

When the session setup has been completed, application 370 may create a page (in the case of a web-based application) or other information relevant to the session, 335. In one embodiment the page provided by application 370 includes additional metadata to be used for communicating context information between application 370 and firewall 340. The metadata may be, for example, information to update the firewall context data based on operations and/or analysis of application 370.

Firewall 340 receives the page with the metadata. In one embodiment, firewall 340 forwards the page to user device 300 without removing the metadata. In one embodiment, firewall 340 adds a secure hash to the table based on the metadata, 345, and may correlate the metadata with the session context for future use. Firewall 340 may store some or all of the correlation information. Firewall 340 may also digitally sign and/or encrypt the metadata.

In response to receiving the page, user device 300 may provide the information from application 370 to a user of user device 300. For example, user device 300 may provide a page view in a browser or some other graphical representation of the information provided by application 370. In response to receiving the information, the user may provide some input to user device 300, for example, by clicking on a link or otherwise interacting with the presented information, 355.

In response to the user input, user device 300 may send a page request, or other configuration of data, 365, to application 370. In one embodiment, the page request includes some or all of the metadata received from application 370 and/or firewall 340. In order to get to application 370, the page request passes through firewall 340.

When firewall 340 receives the page request from user device 300, firewall 340 utilizes the metadata and/or other context information to confirm the hash and may use the metadata to check the page request from the user, 375. When firewall 340 checks the page request from user device 300, firewall 340 may make decisions on how to treat the page request based on the firewall context information. For example, if the page request from user device 300 does not satisfy the criteria described by the context information, firewall 340 may drop or block the traffic corresponding to the page request. In another example, firewall 340 may flag the traffic to provide additional information to application 370 to allow application 370 to make decisions on how to process the page request from user device 300.

As the session continues, context information stored as metadata may be utilized by firewall 340 and/or application 370 and may be updated as the monitored conditions change. This allows both firewall 340 and application 370 to make more informed decisions when processing traffic during the session. As discussed above with respect to FIGS. 1A-1C, the configurations of firewall 340 and application 370 may vary, but the use of the context information may be applied to any of the configurations.

The examples of FIG. 2 and FIG. 3 are discussed separately; however, the context information utilized in providing context-based firewall functionality may also be a combination of the functionality described in FIGS. 2 and 3. That is, a firewall may store some context information while passing other context information as metadata. Therefore, the description of FIG. 2 and FIG. 3 should not be considered mutually exclusive.

Figure 4:
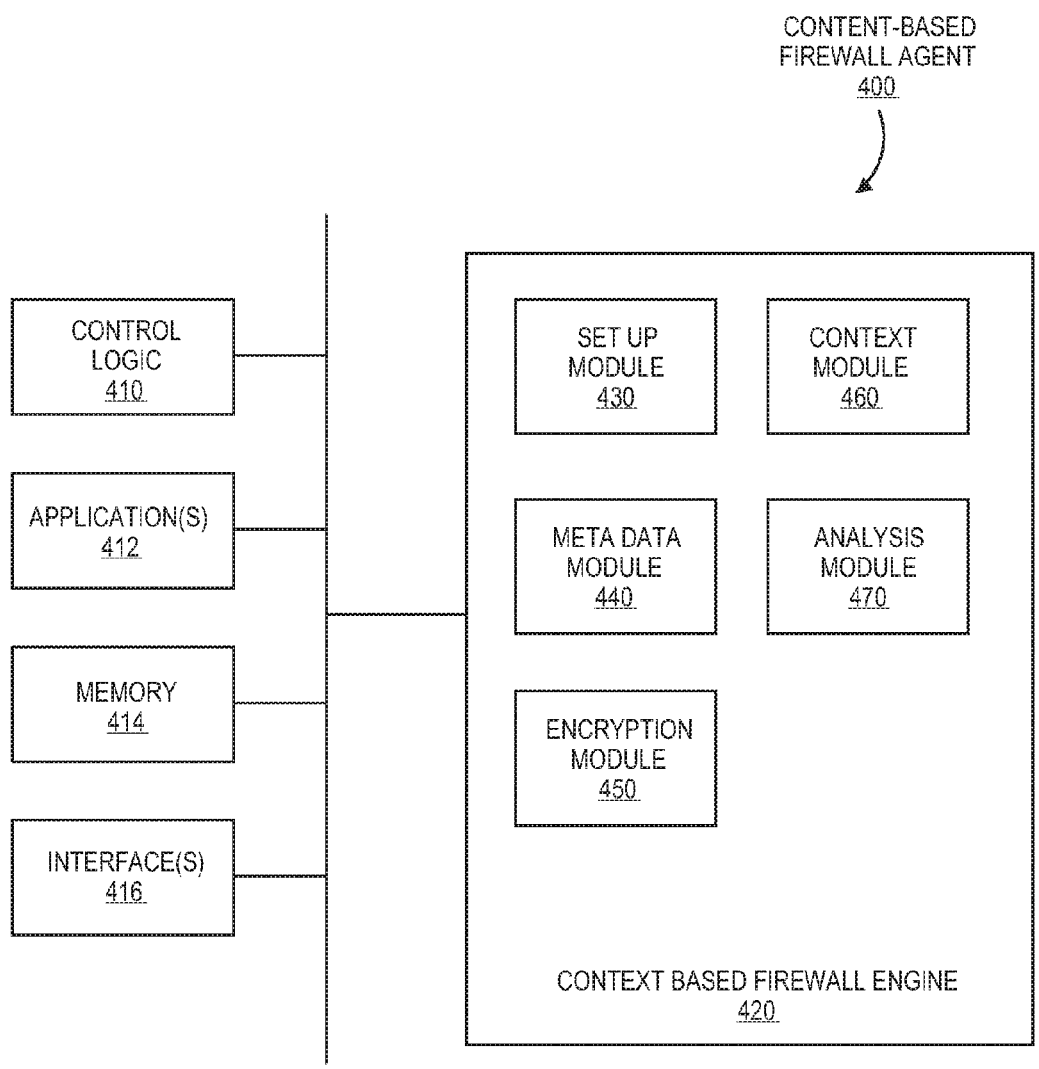
FIG. 4 is a block diagram of one embodiment of an agent that may be utilized to support context based firewall functionality.

FIG. 4 is a block diagram of one embodiment of an agent that may be utilized to support context based firewall functionality. The functionality of context-based firewall agent 400 may be provided as part of a firewall and/or as part of an application provided by a server platform coupled with a firewall.

Context-based firewall agent 400 includes control logic 410, which implements logical functional control to direct operation of context-based firewall agent 400, and/or hardware associated with directing operation of context-based firewall agent 400. Logic may be hardware logic circuits and/or software routines. In one embodiment, context-based firewall agent 400 includes one or more applications 412, which represent code sequence and/or programs that provide instructions to control logic 410.

Context-based firewall agent 400 includes memory 414, which represents a memory device and/or access to a memory resource for storing data and/or instructions. Memory 414 may include memory local to context-based firewall agent 400, as well as, or alternatively, including memory of the host system on which context-based firewall agent 400 resides. Context-based firewall agent 400 also includes one or more interfaces 416, which represent access interfaces to/from (an input/output interface) context-based firewall agent 400 with regard to entities (electronic or human) external to context-based firewall agent 400.

Context-based firewall agent 400 also includes context-based firewall engine 420, which represents one or more functions or module that enable context-based firewall agent 400 to provide the firewall services as described above. The example of FIG. 4 provides several modules that may be included in context-based firewall engine 420; however, different and/or additional modules may also be included. Example modules that may be involved in providing the firewall functionality include setup module 430, metadata module 440, encryption module 450, context module 460 and analysis module 470. Each of these modules may further include other sub-modules to provide other functions. As used herein, a module refers to routine, a subsystem, logic circuit, microcode, etc., whether implemented in hardware, software, firmware or some combination thereof.

Setup module 430 provides the functionality to set up and monitor user sessions and corresponding traffic. In one embodiment, setup module 430 provides data structures and other mechanisms to store and organize context information about a user session. Setup module 430 may provide this functionality to the firewall and/or the application.

Metadata module 440 provides the functionality to create, modify and/or otherwise manage metadata to be used for context-based firewall functionality as described herein. Metadata module 440 may create the metadata in any useful format and may utilize any useful schema. The metadata can be stored in, for example, memory 414, or any other storage device. Metadata module 440 may provide this functionality to the firewall and/or the application.

Encryption module 450 provides encryption services to the firewall and/or the application. Any encryption protocols/schemes known in the art may be supported. In one embodiment, encryption module 450 provides the hashing operations discussed above. Encryption module 450 may provide additional functionality, for example, digital signatures. In embodiments not utilizing encryption, encryption module 450 may be absent from context-based firewall engine 420. Encryption module 450 may provide this functionality to the firewall and/or the application.

Context module 460 manages context information for use in firewall functionality. Context module 460 may acquire and/or derive one or more of the context elements discussed above. Also, context module 460 may operate with setup module 430 to provide the initial context set up as described with respect to FIGS. 2 and 3. Encryption module 450 may provide various operations that utilize encryption functionality to the firewall and/or the application.

Analysis module 470 operates to analyze network traffic based on contextual information provided by context module 460 and/or metadata module 440. Analysis module may utilize the context information to evaluate network traffic. Analysis module 470 may cause the firewall and/or the application to perform the operations as described above with respect to request messages and response messages. The contextual firewall functionality may be applied to any type of network traffic.

Figure 5:
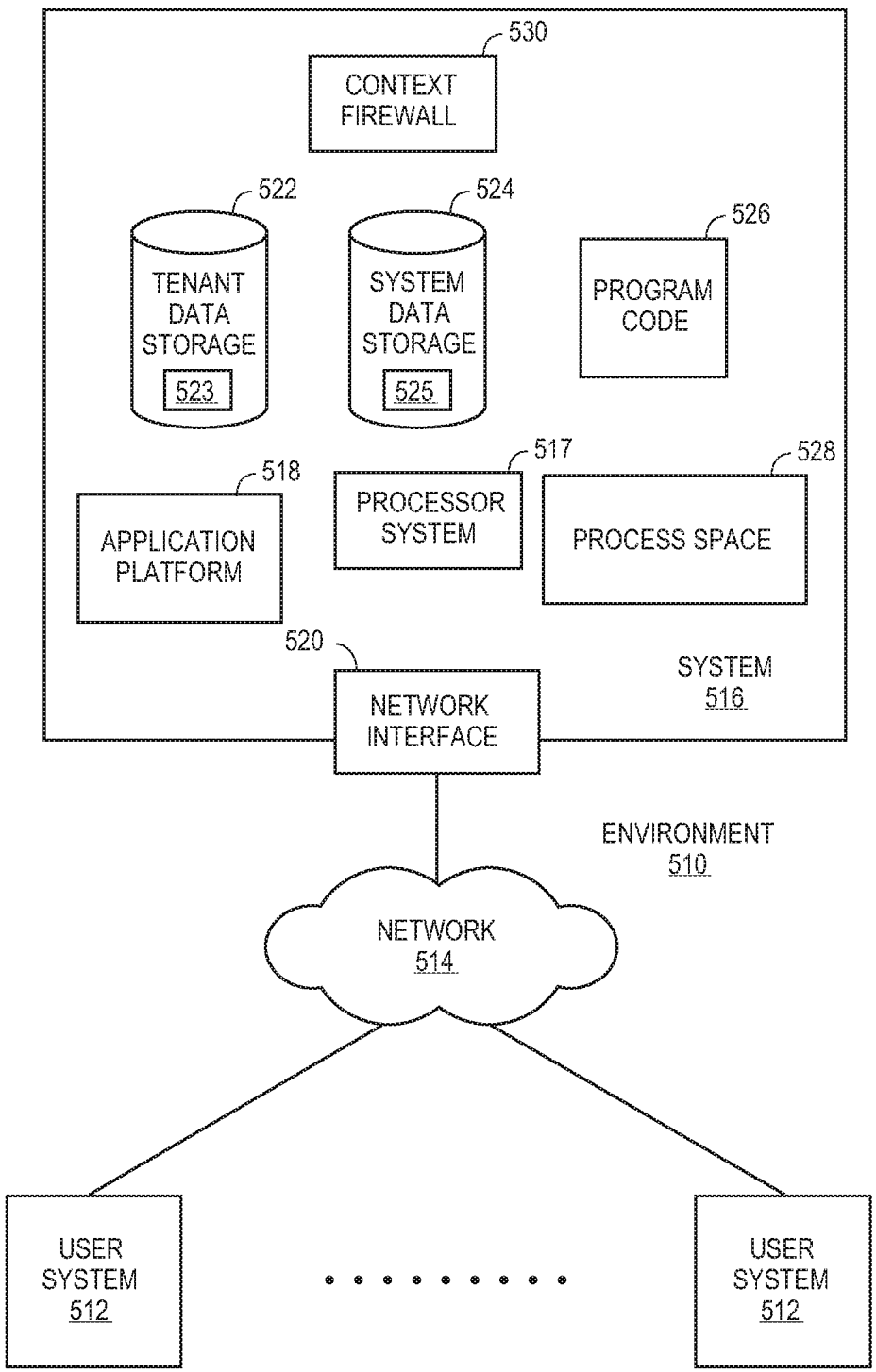
FIG. 5 is a block diagram of an environment in which an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516. System 516 may include context firewall 530 that operates as the firewalls described herein.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator.

In systems with a hierarchical role model, users at one permission level may have access to applications, data, and database information accessible by a lower permission level user, but may not have access to certain applications, database information, and data accessible by a user at a higher permission level within the same hierarchy branch, and/or any level (lower, equal, and higher) in another hierarchy branch. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, web pages and other information to and from user systems 512 and to store to, and retrieve from, a database system related data, objects, and Webpage content.

With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514.

Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 516 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 516 is configured to provide web pages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
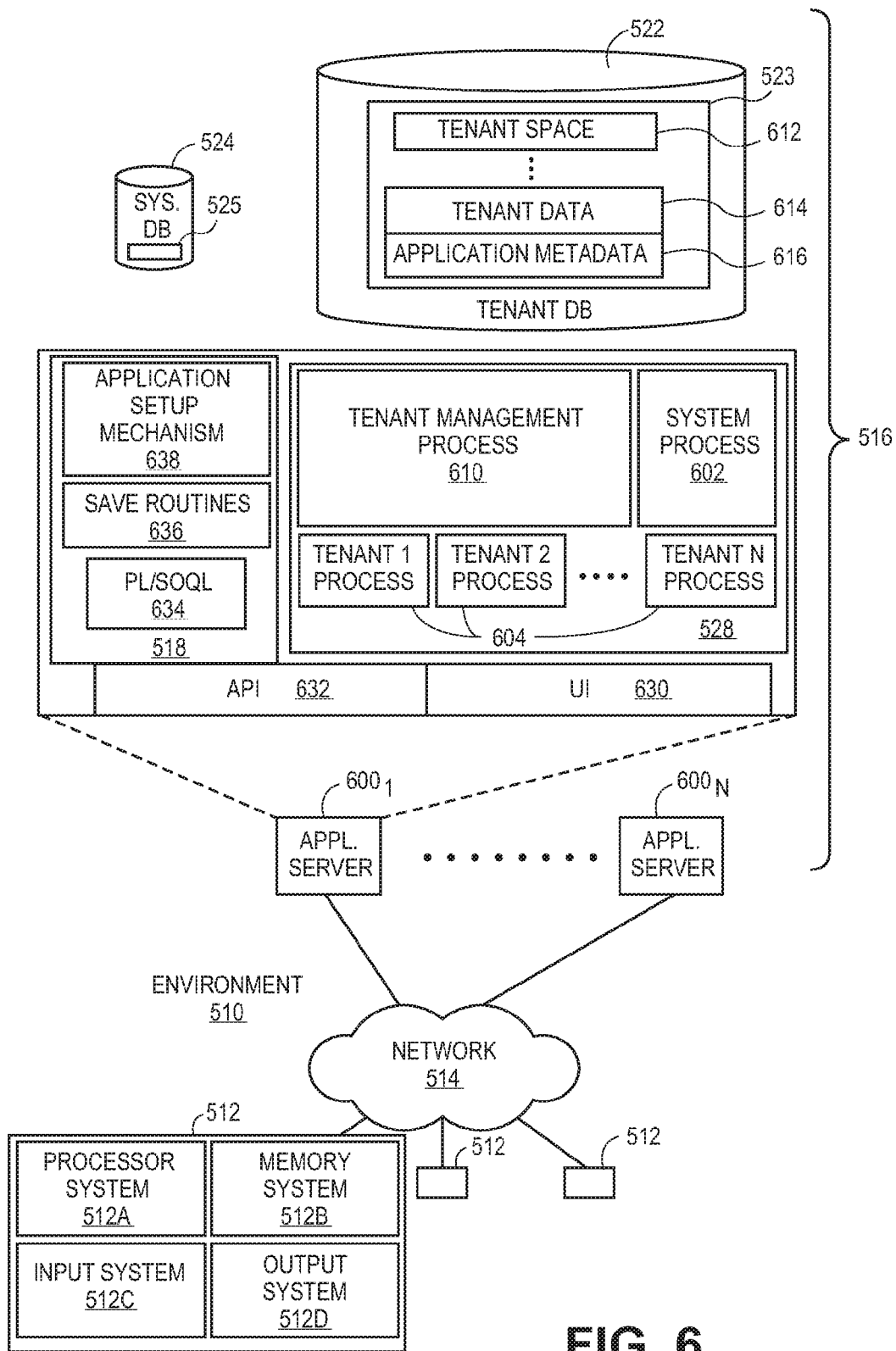
FIG. 6 is a block diagram of one embodiment of a multi-tenant environment.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage space 612, tenant data 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks.

As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512.

The tenant data 523 might be divided into individual tenant storage spaces 612, which can be either a physical arrangement and/or a logical arrangement of data. Within each tenant storage space 612, tenant data 614 and application metadata 616 might be similarly allocated for each user. For example, a copy of a user's most recently used (MRU) items might be stored to tenant data 614. Similarly, a copy of MRU items for an entire organization that is a tenant might be stored to tenant storage space 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600i$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600.

In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein.

Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
running an application level firewall on a hardware computing device in response to initiation of a user session with a remote resource to provide application level or higher analysis of network traffic and to utilize context information shared between the application level firewall and one or more applications to be used during the user session to perform network and application security operations with the application level firewall and at least one of the one or more applications to make security evaluations;
receiving, with the application level firewall, a response to provide information from at least one application to at least one client hardware computing device, the response having at least metadata to be used to update the firewall context information;
updating the context information using the application level firewall based on the metadata; and
transmitting, with the application level firewall, the response to the client hardware computing device.

2. The method of claim 1, wherein the remote resource comprises a resource that is available in a multitenant environment.

3. The method of claim 1 wherein the firewall context information comprises one or more of: translation information, field validation information and/or request/response validation information.

4. The method of claim 1 wherein the firewall context information comprises one or more of: traffic policy information, user information and/or organization information.

5. The method of claim 1 wherein the firewall context information comprises one or more of: session information and/or score information.

6. The method of claim 1 wherein the application context information comprises one or more of: translation information, field validation information and/or request/response validation information.

7. The method of claim 1 wherein the application context information comprises one or more of: traffic policy information, user information and/or organization information.

8. The method of claim 1 wherein the application context information comprises one or more of: session information and/or score information.

9. An article comprising a non-transitory computer-readable medium having stored thereon instructions that, when executed by one or more processors, cause the one or more processors to:
run an application level firewall on a hardware computing device in response to initiation of a user session with a remote resource to provide application level or higher analysis of network traffic and to utilize context information shared between the application level firewall and one or more applications to be used during the user session to perform network and application security operations with the application level firewall and at least one of the one or more applications to make security evaluations;

receive, with the application level firewall, a response to provide information from at least one application to at least one client hardware computing device, the response having at least metadata to be used to update the firewall context information;

update the context information using the application level firewall based on the metadata; and transmit, with the application level firewall, the response to the client hardware computing device.

10. The article of claim 9, wherein the remote resource comprises a resource that is available in a multitenant environment.

11. The article of claim 9 further comprising instructions that, when executed by the one or more processors, cause the one or more processors to perform an application context setup with the remote resource on the server device in response to the user session, the application context information to be used during the user session to perform network and application security operations with the remote resource.

12. The article of claim 9 wherein the firewall context information comprises one or more of: translation information, field validation information and/or request/response validation information.

13. The article of claim 9 wherein the firewall context information comprises one or more of: traffic policy information, user information and/or organization information.

14. The article of claim 9 wherein the firewall context information comprises one or more of: session information and/or score information.

15. The article of claim 9 wherein the application context information comprises one or more of: translation information, field validation information and/or request/response validation information.

16. The article of claim 9 wherein the application context information comprises one or more of: traffic policy information, user information and/or organization information.

17. The article of claim 9 wherein the application context information comprises one or more of: session information and/or score information.

18. A system comprising:

at least one memory device; and one or more server hardware computing systems communicatively coupled with the at least one memory device, the server systems to run an application level firewall in response to initiation of a user session with a remote resource to provide application level or higher analysis of network traffic and to utilize context information shared between the application level firewall and one or more applications to be used during the user session to perform network and application security operations with the application level firewall and at least one of the one or more applications to make security evaluations, to receive a response to provide information from at least one application to at least one client hardware computing device, the response having at least metadata to be used to update the firewall context information, to update the context information based on the metadata, and to transmit the response to the client hardware computing device.

19. The system of claim 18 wherein the firewall context information comprises one or more of: translation information, field validation information and/or request/response validation information.

20. The system of claim 18 wherein the firewall context information comprises one or more of: traffic policy information, user information and/or organization information.

21. The system of claim 18 wherein the firewall context information comprises one or more of: session information and/or score information.

22. The system of claim 18 wherein the application context information comprises one or more of: translation information, field validation information and/or request/response validation information.

23. The system of claim 18 wherein the application context information comprises one or more of: traffic policy information, user information and/or organization information.

24. The system of claim 23 wherein the application context information comprises one or more of: session information and/or score information.

* * * * *